United States Patent
Pitkämäki

(10) Patent No.: US 12,320,381 B2
(45) Date of Patent: Jun. 3, 2025

(54) METHOD FOR MOUNTING A STACK OF SEPARATING DISCS IN A CENTRIFUGAL SEPARATOR BOWL AND A TOOL

(71) Applicant: Alfa Laval Corporate AB, Lund (SE)

(72) Inventor: Jouko Pitkämäki, Eskilstuna (SE)

(73) Assignee: ALFA LAVAL CORPORATE AB, Lund (SE)

( * ) Notice: Subject to any disclaimer, the term of this patent is extended or adjusted under 35 U.S.C. 154(b) by 616 days.

(21) Appl. No.: 17/773,225

(22) PCT Filed: Nov. 9, 2020

(86) PCT No.: PCT/EP2020/081474
§ 371 (c)(1),
(2) Date: Apr. 29, 2022

(87) PCT Pub. No.: WO2021/099162
PCT Pub. Date: May 27, 2021

(65) Prior Publication Data
US 2022/0412383 A1    Dec. 29, 2022

(30) Foreign Application Priority Data
Nov. 22, 2019   (EP) ..................................... 19211006

(51) Int. Cl.
F16B 5/02    (2006.01)
B04B 1/08    (2006.01)
B04B 7/14    (2006.01)

(52) U.S. Cl.
CPC ................ *F16B 5/02* (2013.01); *B04B 1/08* (2013.01); *B04B 7/14* (2013.01)

(58) Field of Classification Search
CPC ................ F16B 5/02; B04B 1/08; B04B 7/14
See application file for complete search history.

(56) References Cited

U.S. PATENT DOCUMENTS

| | | |
|---|---|---|
| 3,384,348 A | 5/1968 | Wicker |
| 4,059,223 A | 11/1977 | Lewis |
| (Continued) | | |

FOREIGN PATENT DOCUMENTS

| | | |
|---|---|---|
| CH | 597 919 A5 | 4/1978 |
| CN | 1250387 A | 4/2000 |
| (Continued) | | |

OTHER PUBLICATIONS

Chinese Notification to Grant Patent Right for Invention dated Aug. 30, 2023 for Application No. 202080080419.6 with an English translation.

(Continued)

*Primary Examiner* — Amber R Orlando
*Assistant Examiner* — Shuyi S. Liu
(74) *Attorney, Agent, or Firm* — Birch, Stewart, Kolasch & Birch, LLP

(57) ABSTRACT

A method for mounting a stack of separating discs in a centrifugal separator bowl comprising a bowl body and a bowl hood includes mounting and securing the stack of separating discs on a distributor; placing and rotatably fixing the distributor in the bowl body; mounting the bowl hood on the bowl body; arranging a compression tool for compressing the stack of separating discs; fastening the screw with a second threaded end in a first (threading) of the distributor; tightening said nut, in relation to said first threaded end of said screw in such a manner that said distributor is lifted to an upper position; fixing the distributor in its upper position; and dismounting the compression tool. A compression tool for performing the method includes a support, a screw and a nut in accordance to above. A centrifugal separator kit includes a centrifugal separator and the compression tool.

18 Claims, 6 Drawing Sheets

(56) References Cited

U.S. PATENT DOCUMENTS

| | | | |
|---|---|---|---|
| 4,393,027 | A | 7/1983 | Gessler |
| 2004/0129151 | A1 | 7/2004 | Ash |
| 2006/0100083 | A1 | 5/2006 | Lagerstedt et al. |
| 2018/0141057 | A1 | 5/2018 | Hagqvist et al. |

FOREIGN PATENT DOCUMENTS

| | | | |
|---|---|---|---|
| CN | 1942248 | A | 4/2007 |
| CN | 101284258 | A | 10/2008 |
| CN | 101342516 | A | 1/2009 |
| CN | 101678368 | A | 3/2010 |
| CN | 202516701 | U | 11/2012 |
| CN | 103316782 | A | 9/2013 |
| CN | 103357513 | A | 10/2013 |
| CN | 105363571 | A | 3/2016 |
| CN | 105813772 | A | 7/2016 |
| CN | 207085482 | U | 3/2018 |
| CN | 108080153 | A | 5/2018 |
| CN | 207654760 | U | 7/2018 |
| CN | 109890510 | A | 6/2019 |
| DE | 288 322 | A5 | 3/1991 |
| DE | 10 2007 047 744 | A1 | 4/2009 |
| DE | 10 2017 108 168 | A1 | 10/2018 |
| EP | 0 208 485 | A1 | 1/1987 |
| EP | 0 281 666 | A2 | 9/1988 |
| EP | 0 373 781 | A2 | 6/1990 |
| FR | 403.268 | A | 10/1909 |
| GB | 566649 | A | 1/1945 |
| GB | 643726 | | 9/1950 |
| JP | 62-11563 | A | 1/1987 |
| JP | 2-81639 | U | 6/1990 |
| JP | 2008-508784 | A | 3/2006 |
| JP | 2010-521287 | A | 6/2010 |
| KR | 10-2010-0015527 | A | 2/2010 |
| KR | 10-2013-0125843 | A | 11/2013 |
| WO | WO 98/40164 | A1 | 9/1998 |
| WO | WO 2004/020105 | A2 | 3/2004 |
| WO | WO 2004/020105 | A3 | 3/2004 |
| WO | WO 2008/111889 | A1 | 9/2008 |
| WO | WO 2010/008342 | A1 | 1/2010 |
| WO | WO 2015/091846 | A1 | 6/2015 |
| WO | WO 2018/077936 | A1 | 5/2018 |

OTHER PUBLICATIONS

Liu et al., "Application of High Speed Centrifugal Machine in Production of Petroleum Sulphonate", Process Equipment & Piping, vol. 45, No. 4, Aug. 2008, pp. 42-45 with an English translation.
Chinese Office Action and Search Report dated Mar. 31, 2023 for Application No. 202080080419.6 with an English translation.
International Search Report, issued in PCT/EP2020/081474, dated Feb. 4, 2021.
Written Opinion of the International Searching Authority, issued in PCT/EP2020/081474, dated Feb. 4, 2021.
New Zealand Office Action for New Zealand Application No. 787501, dated Jul. 23, 2024.

METHOD FOR MOUNTING A STACK OF SEPARATING DISCS IN A CENTRIFUGAL SEPARATOR BOWL AND A TOOL

The present invention relates to a method for mounting a disc stack in a centrifugal separator bowl. The present invention also relates to a compression tool for performing the method.

BACKGROUND

In a centrifugal separator for separation of a liquid mixture into at least one heavy phase and one light phase having a relative lower density than said heavy phase a stack of separating discs may be used for enhancing the separation efficiency. Typically, the stack of separating discs is stacked on a distributor with a certain distance to each other, which distributor distributes the liquid mixture to the separating discs. The distributor is arranged in a rotatable separator bowl, comprising a lower part or bowl body and an upper part or bowl hood. The main part of the separation takes place between the separating discs. However, to obtain the best separation, the stack of separating discs has to be compressed, so that leakage between the discs can be prevented. This is usually obtained by, after fixedly mounting the stack of separating discs in the bowl body of the separation bowl, by mounting the bowl hood on top of the bowl body and by fastening it. This is usually done by screwing the bowl hood on the bowl body by using corresponding threadings on the bowl body and the bowl hood. At the same time the under-side of the bowl hood is in contact with the uppermost disc or top disc of the stack of separating discs. When the bowl hood is screwed onto the bowl body the stack of separating discs is compressed. However, this is obtained with effort since the friction between the under-side of the bowl hood and the top disc counteract the mounting of the bowl hood as does the increasing compression forces from the increasingly compressed stack of separating discs acting on the under-side of the bowl hood.

Thus, there is a need to facilitate the mounting of the bowl hood.

SUMMARY OF THE INVENTION

The objective of the present invention is to provide easy mounting of the bowl hood before compressing the disc stack.

The above objective is attained according to the present invention by a method for mounting a stack of separating discs in a centrifugal separator bowl comprising a bowl body and a bowl hood as defined in the appended claims. Especially, the method according to the present disclosure comprises the following steps of:
  a) mounting and securing said stack of separating discs on a distributor;
  b) placing and rotatably fixing said distributor in said bowl body;
  c) mounting said bowl hood on said bowl body;
  d) arranging a compression tool for compressing said stack of separating discs, said compression tool comprising a support having a centre axis, a screw supported coaxially with said centre axis in said support, and a nut threaded onto a first threaded end of said screw and adapted to be resting against a first end of said support, with a second end of said support on said bowl hood or a neck ring attached to said bowl hood and said screw extending into a central through-hole in said bowl hood;
  e) fastening said screw with its second threaded end in a first threading of said distributor;
  f) tightening said nut with a pre-determined torque, in relation to said first threaded end of said screw in such a manner that said distributor is lifted to an upper position;
  g) fixing said distributor in its upper position;
  h) dismounting said compression tool.

The step f) of the method may comprise a step i) of tightening said nut until said stack of separating discs is making contact against said bowl hood.

The step f) may further comprise a step j) of tightening said nut until said stack of separating discs is compressed with a predetermined torque.

The step a) may of the method further comprise a step k) of mounting the stack of separating discs pre-compressed on said distributor.

Further the step k) of the method may comprise steps of
  l) arranging a compression tool for compressing said stack of separating discs, comprising a first support having a centre axis (X), a screw arranged coaxially with said centre axis in said first support, and a nut threaded onto a first threaded end of said screw and adapted to be resting against a first end of said first support, with a second end of said first support on the uppermost disc of said stack of separating discs;
  m) fastening said screw with its second threaded end in a first threading in said distributor
  n) turning said nut in relation to said first threaded end of said screw in such a manner that said distributor is lifted in relation to said first support so that said stack of separating discs is pre-compressed with a pre-determined torque.

Step d) of the method may be modified such that said compression tool or at least said nut and said first support is dismounted and when arranging the compression tool a second support is used.

The method may further in the step c) comprise a step of:
  o) mounting a threaded lock ring around said screw; and wherein step g) comprises a step of:
  p) screwing the lock ring into a second threading of said distributor adapted to press against said bowl hood or said neck ring.

Further, the step c) may comprise a step of:
  q) threading said bowl hood onto said bowl body by corresponding threadings.

According to the present invention, the above objective is also realized by a compression tool for performing the methods above, comprising
  a support;
  a screw;
  a nut;
  wherein said nut is threaded onto a first threaded end of said screw, adapted to be resting against a first end of said support, and when in operation further threadable onto said first threaded end of said screw;
  a support adapted to be placed with a second end on a bowl hood mounted on a centrifugal separator bowl;
  a screw supported coaxially in said support and adapted with its second threaded end to be fastened in a distributor arranged in said separator bowl;

The present invention also relates to a centrifugal separator kit, which comprises a centrifugal separator with a stack of separating discs and a distributor adapted to be arranged in a centrifugal separator bowl of said centrifugal separator, and a compression tool according to said second aspect above.

BRIEF DESCRIPTION OF THE DRAWINGS

Further objects, features and advantages will appear from the following detailed description of several embodiments of the invention with reference to the drawings, in which.

DETAILED DESCRIPTION OF THE DRAWINGS

Separator

Figure 1:
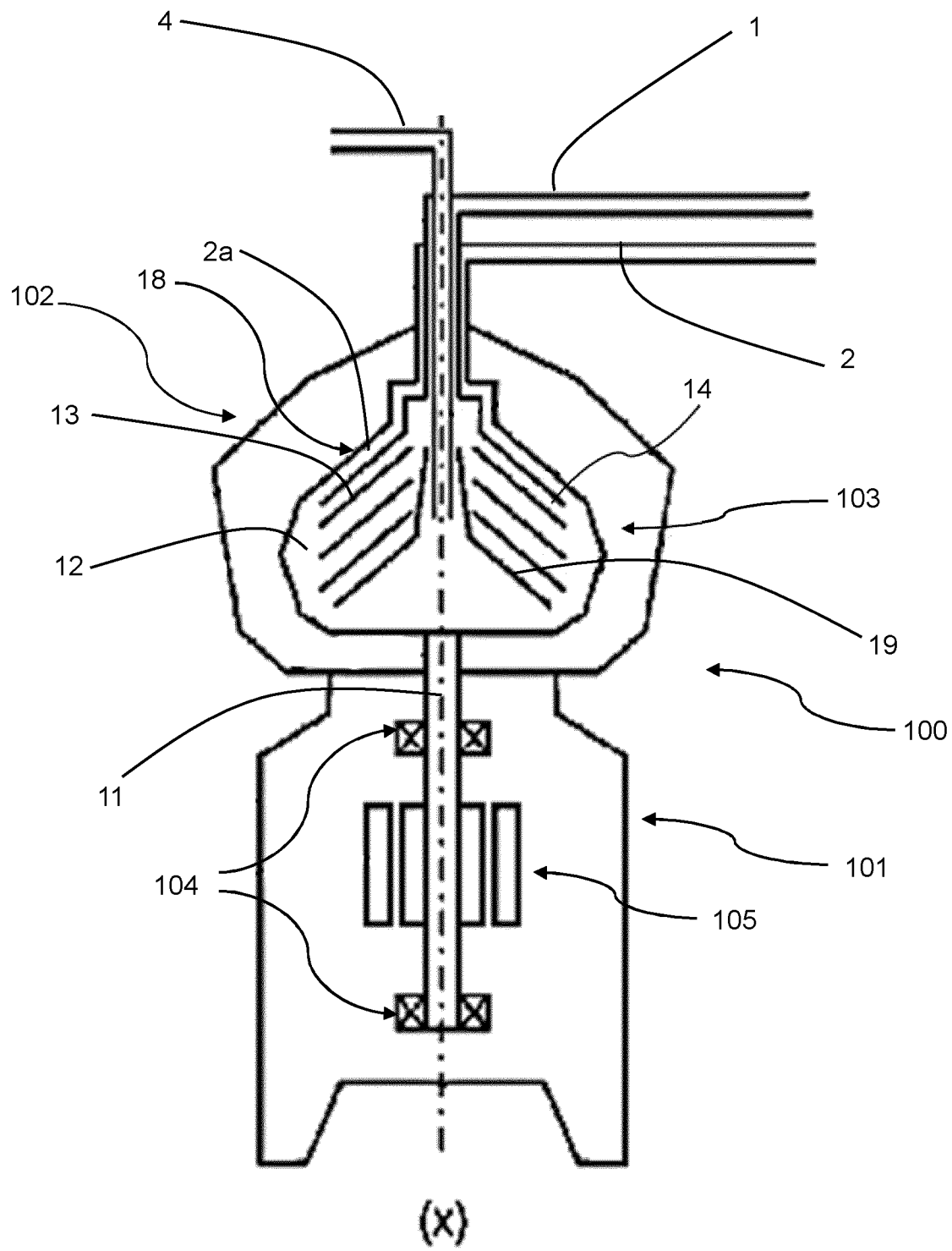
FIG. 1 shows a centrifugal separator.

FIG. 1 shows a centrifugal separator 100 for separating a fluid mixture into a light phase liquid and a heavy phase of sludge or sediment. The centrifugal separator 100 comprises a stationary part here called frame 101 comprising a housing 102, and a centrifugal separator bowl 18 fixedly arranged on a spindle 11, the separator bowl 18 and the spindle 11 together constituting a rotor 103. Said centrifugal separator bowl 18 comprises a lower part, i.e. a centrifugal separator bowl body 5, and an upper part, i.e. a centrifugal separator bowl hood 6, as shown more in detail in FIG. 4-6.

Figure 4:
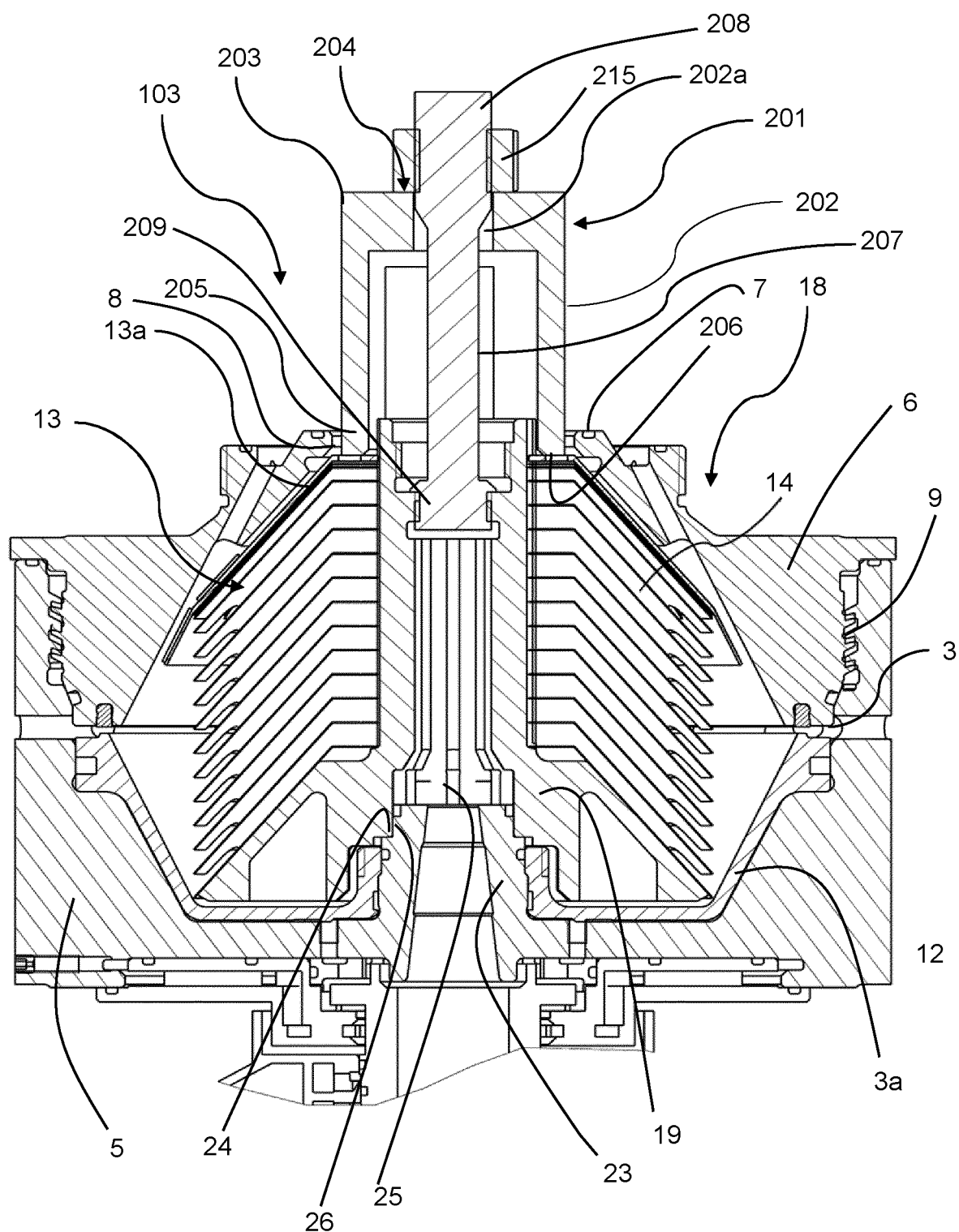
FIG. 4 shows a centrifugal separator bowl in section after mounting the bowl hood.
Figure 5:
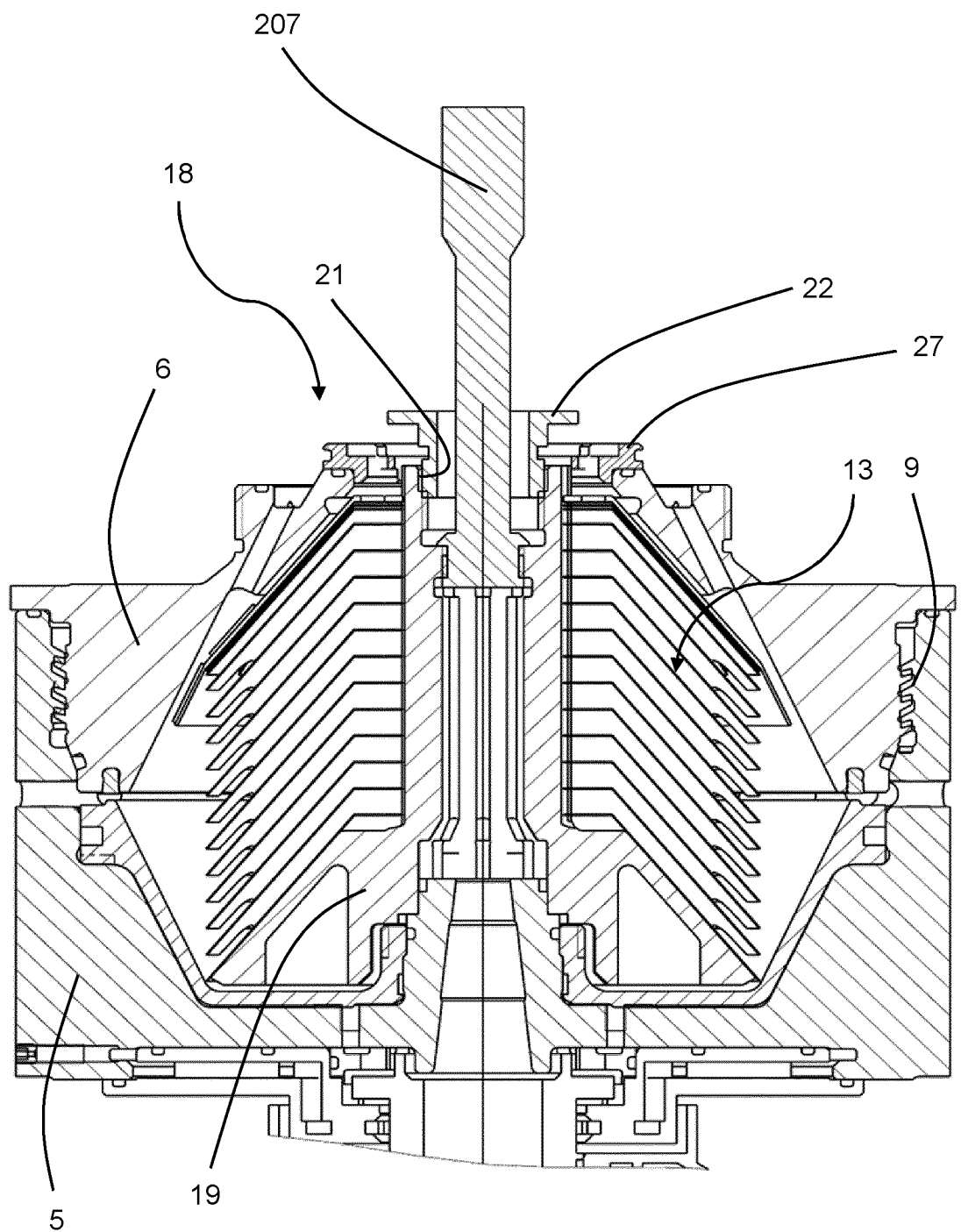
FIG. 5 shows a centrifugal separator bowl in section after mounting of sleeve and fitting.
Figure 6:
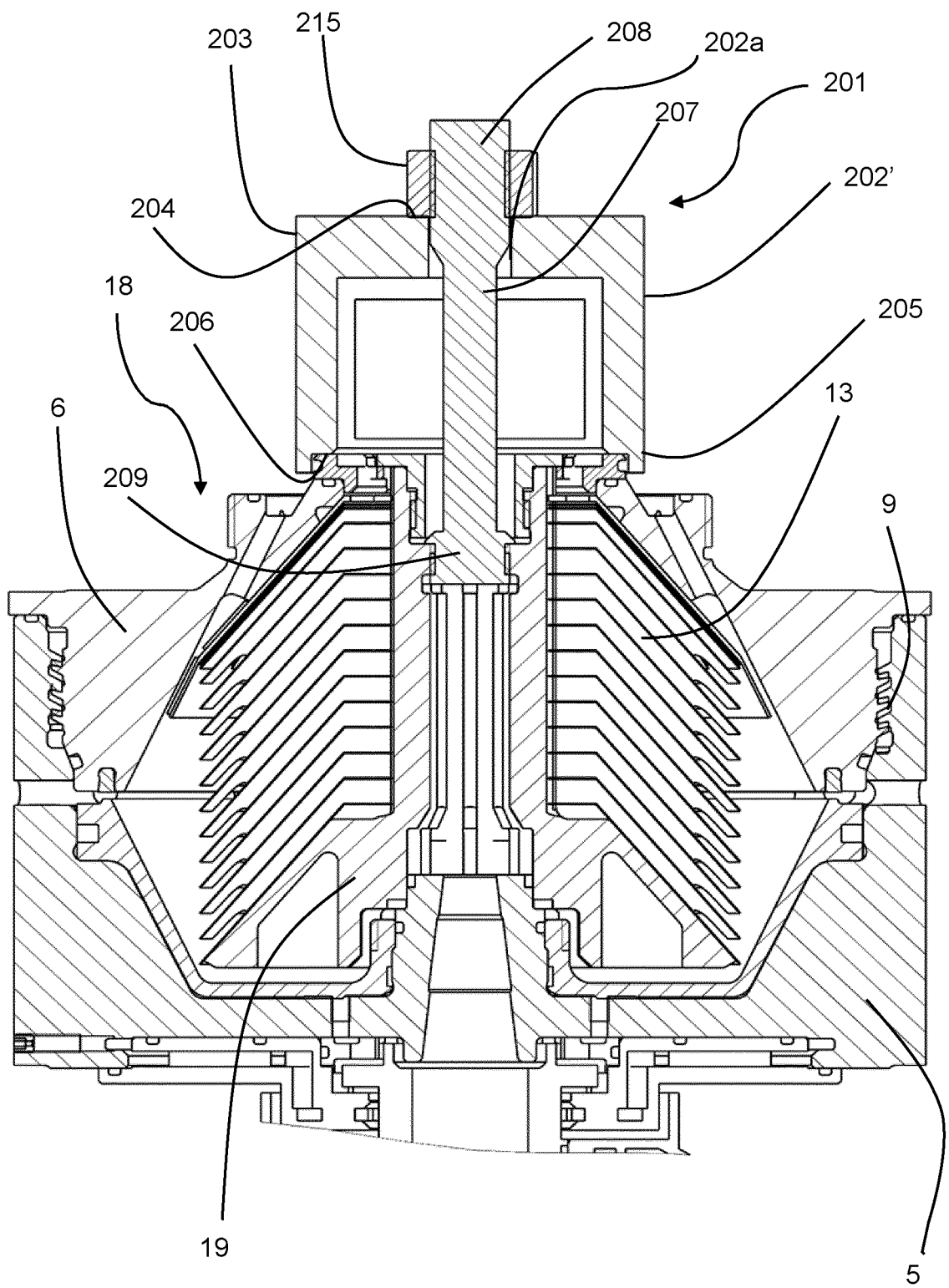
FIG. 6 shows a centrifugal separator bowl in section after compression of the stack of separating discs.

As further shown in detail in FIG. 4-6, the centrifugal separator bowl hood 6 is fastened to the centrifugal separator bowl body 5 by corresponding threadings 9 on said centrifugal separator bowl hood 6 and centrifugal separator bowl body 5.

The bowl hood 6 has a central through-hole 8 connecting the outside of the separator bowl 18 with the inside. In this through-hole 8 a neck ring 27, shown in FIG. 5, may be arranged, which neck ring 27 narrows the through-hole 8. Through the through-hole 8 one or more outlets of separated phases from the inside of the separator bowl 18 and/or an inlet for supplying a liquid mixture to be separated into different phases may be arranged.

FIG. 4 further shows that said rotor 103 surrounds a sludge space 12 and a separation space 14. In the center of the separator bowl 18 a distributor 19 is arranged on a nave 23 which forms part of the bowl body 5 protruding axially upwards. The nave 23 is stuck into a center bottom hole 25 in the distributor 19. The distributor 19 has vertical wings 26 in the wall of the center bottom hole 25 which fit with slots 24 in the nave 23.

Figure 3:
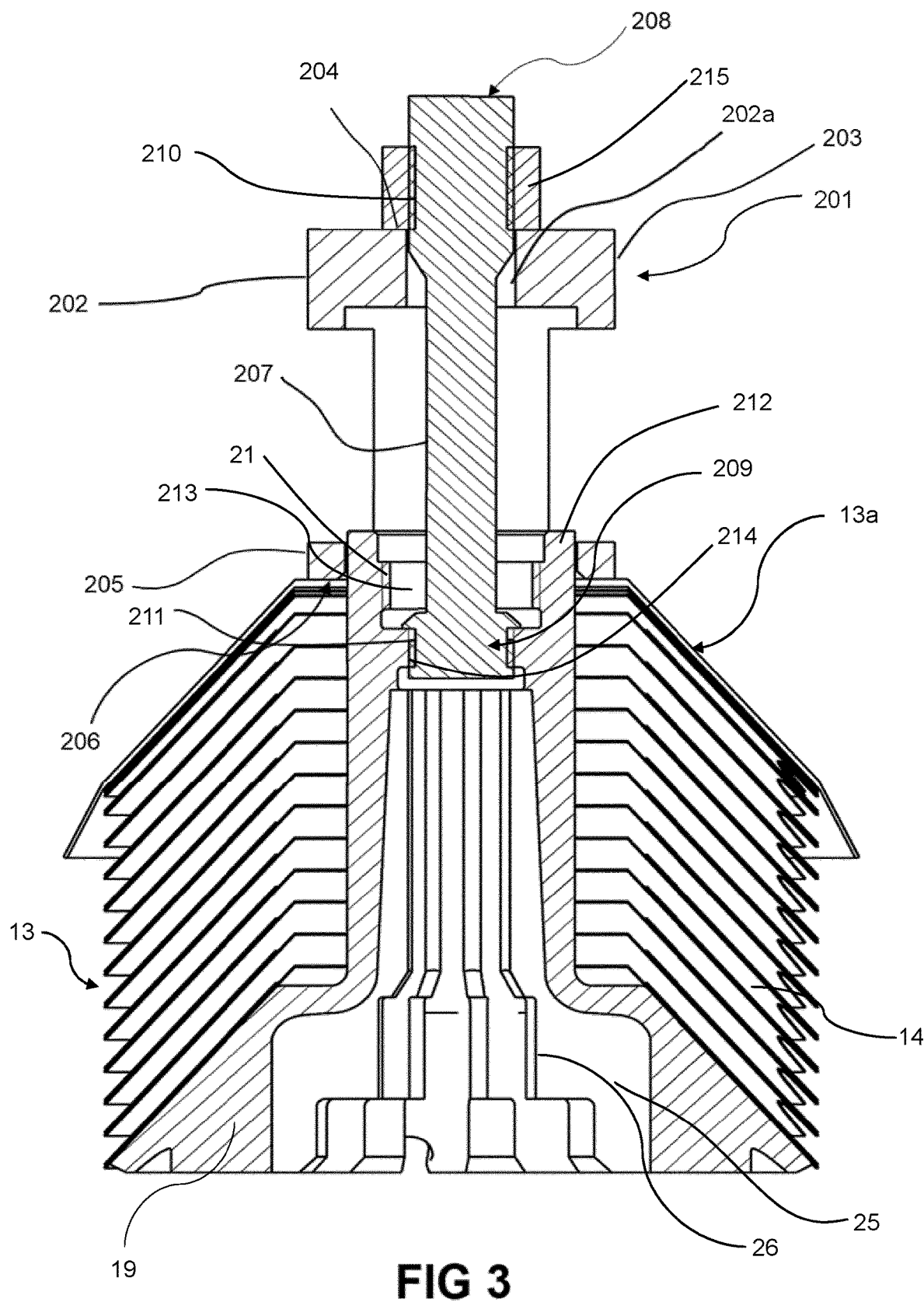
FIG. 3 shows a stack of separating discs with a compression tool mounted in section, during pre-compression of the stack of separating discs.

As best shown in FIG. 3, the distributor 19 has a top end 212 with a bore 213 in which a first interior threading 214 is arranged. The distributor 19 also has a second interior threading 21 adapted to receive a lock ring 22, see FIG. 5, to lock said distributor 19 after the compression of the stack 13 of separating discs.

With reference to FIG. 1, on the distributor 19 a stack 13 of frusto-conical separating discs is arranged stacked on each other with an axial distance, forming spaces between each other which together form said separation space 14.

The discs are rotationally secured on said distributor 19 e.g. by a notch or notches and corresponding groove or grooves. The rotor 103 is rotatably journaled in said housing 102 around a rotational axis X by a bearing arrangement 104 and driven by a drive arrangement 105. Said drive arrangement 105 comprises an electric motor either arranged to drive the rotor 103 directly by arranging a motor rotor on said rotor 103, or by arranging a transmission between said electric motor and said rotor 103. Said transmission may be a transmission belt or a gear transmission.

The separator bowl 18 has an inlet channel 4 in said spindle 11 for feeding the liquid mixture to be separated into said separator bowl 18. The spindle 11 disclosed in FIG. 1 is thus a hollow spindle. Said inlet channel 4 lead the liquid mixture to the distributor 19 which transport the fluid mixture from the center of the rotor out to the separator discs of the stack 13 of separator discs. In other embodiments the inlet channel 4 may be arranged from the top to the distributor 19 and out to said stack 13 of separation discs.

The lighter phase of the fluid mixture will move inward towards the center of the rotor 103 and is transported out from the center of the stack 13 of separating discs and leaves the centrifugal separator 100 by a first outlet 1. The heavy phase moves by the centrifugal forces outward to said sludge space 12, where it is transported to a second outlet 2 via heavy phase pipes. In an embodiment, as a complement or as an alternative, the second phase may be discharged by outlet ports arranged circumferentially in the outer wall of the rotor 103. Said outlet ports may open intermittently by a hydraulically operated sliding bowl bottom.

Tool

With reference to the drawings FIGS. 2-4 and FIG. 6, a compression tool 201, useable when mounting and dismounting said stack 13 of separating discs into and from said centrifugal separator bowl 18 is shown.

The compression tool 201 comprises a support 202 (FIG. 2) or 202' (FIG. 6), herein also referred to as a first support 202 and a second support 202', respectively. The first support 202 may have a smaller radius than the second support 202'. The support 202 or 202' comprises a central through-hole 202a, as shown in FIG. 6. The support 202 or 202' has a first end 203 with a first contact surface 204 and a second end 205 with a second contact surface 206. The compression tool 201 further comprises a screw 207 supported axially in said through-hole 202a of said support 202 or 202'. The screw 207 has a first end 208 which is sticking out from said first end 203 of the support 202 or 202' and a second end 209 which is sticking out from said second end 205 of said support 202 or 202', see e.g. FIGS. 3, 4 and 6.

As shown in detail in FIG. 3, the first end 208 of said screw 207 has a first threading 210. Said second end 209 of said screw 207 has a second threading 211 adapted to fit with corresponding first interior threading 214 in said distributor 19 of the centrifugal separator 100.

With further reference to FIGS. 3, 4 and 6, the compression tool 201 further comprises a nut 215 threaded on said first threading 210 of said screw 207 which nut 215 is adapted to be in contact with said first contact surface 204 during compression of said stack 13 of separating discs. As shown in FIG. 4, during compression said second contact surface 206 of the support 202 is adapted to contact and support against an upper surface 7 on the bowl hood 6 arranged around the opening of said central through-hole 8 of the bowl hood 6.

In an embodiment of the method of mounting the stack 13 of separating discs, the stack 13 is pre-compressed before mounted in the separator bowl 18. This is accomplished by using said compression tool 201. The screw 207 of said compression tool 201 is applied with its second threading 211 to the corresponding first threading 214 of the distributor 19 in the same manner as when the final compression is accomplished mentioned above. The contact surface 206 of the support 202 used during pre-compressing of the stack 113 of separating discs will have to be adapted to contact and support against an upper surface 13*a* on the uppermost or top disc of the stack 13 of the separating discs. Thus, as the said upper surface 13*a* on the top disc of the stack 13 of separating discs is situated on a different radius from said rotational axis X, than that of the upper surface 7 on said bowl hood 6, a different support 202, also referred to as a first support, with a smaller diameter is needed for the pre-compression of the stack 13 of separating discs.

Method

According to one embodiment there is a method for mounting a stack 13 of separating discs in a centrifugal separator bowl 18 suggested, comprising a bowl body 5 and a bowl hood 6 and which comprises steps according the following description.

Figure 2:
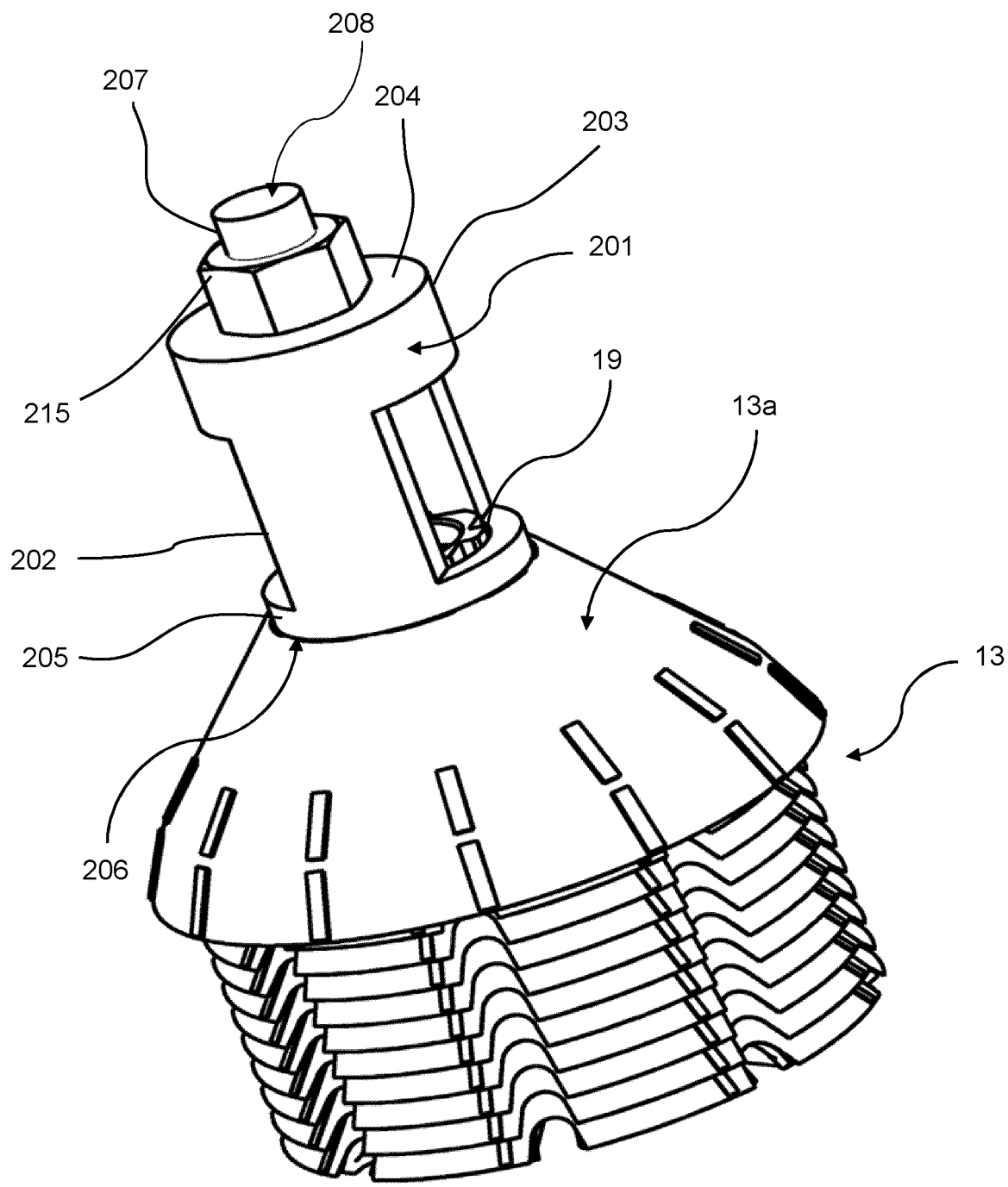
FIG. 2 shows a stack of separating discs with a compression tool mounted during pre-compression of the stack of separating discs.

According to FIG. 2 a stack 13 of separating discs is mounted on a distributor 19. The discs may at the same time be rotationally secured by a notch and groove arrangement described above.

According to FIGS. 2 and 3 the stack 13 of separating discs is pre-compressed and secured in a compressed state on the distributor 19. The pre-compressing is performed by a compression tool 201 comprising a support 202, also referred to as the first support, a screw 207 and a nut 215 as described above. Said support 202 is placed with a second contact surface 206 on its second end 205 axially on the uppermost or top disc of the stack 13 of separating discs. Said screw 207 is arranged through the through-hole 202*a* of the support 202 and fastened with its second end 209 to the distributor 19. More specifically, said screw 207 has a first threading 210 on its second end 209 which is fastened to a first threading 214 in said distributor 19. A nut 215 is threaded onto a first threaded end 208 of said screw 207 and adapted to be resting against a first end 203 of said support 202. The nut 215 is turned clock-wise in relation to said first threaded end 208 of said screw 207 in such a manner that said distributor 19 is lifted in relation to said support 202 so that said stack 13 of separating discs are pre-compressed with a predetermined torque. A typical torque with which the pre-compressing is performed may be 60 Nm.

When in a pre-compressed state the separating discs are fixed in their position on the distributor 19 by the pre-compression force. Thus, the pre-compressed stack 13 of separating discs fits nicely in the separator bowl 18 and the bowl hood 6 may easily be mounted on the bowl body 5.

In FIG. 4 the distributor 19 is placed in said centrifugal separator bowl body 5, and rotationally secured in relation to said bowl body 6. The distributor 19 may be rotationally secured by vertical wings 26 and slots 24 on said distributor 19 and a nave 23 said bowl body 5 protruding centrally.

The distributor 19 has vertical wings 26 in the wall of the center bottom hole 25 which fit with slots 24 in the nave 23.

In FIG. 4 a bowl hood 6 is also mounted on said bowl body 5. The centrifugal bowl hood 6 is fastened to the centrifugal bowl body 5 by screwing the bowl hood 6 on top of the bowl body 5 fitting the threading 9 on the bowl hood 6 on the corresponding threading 9 on the bowl body 5.

FIG. 5 discloses the separator bowl 18 when the nut 215 and support 202 used at the pre-compression have been dismounted. After this, the neck ring 27 is mounted in the central through-hole 8 of the bowl hood 6. The lock ring 22 is at this stage also mounted on the distributor 18 by threading it into a second threading 21 of said distributor 19.

FIG. 6 discloses the separator bowl with the compression tool 201 is mounted for the final compressing of the stack 13 of separating discs. The compression tool 201 comprising a support 202', i.e. a second support having a larger radius than the first support 202, a screw 207 supported coaxially in a central through-hole 202*a* in said support 202', and a nut 215 threaded onto a first threading 210 of the first threaded end 208 of said screw 207 and rested against a first end 203 of said support 202'. The second end 205 of said support 202' is with its contact surface 206 placed on said upper surface 7 of the bowl hood 6. The second support 202' as can be seen in FIG. 6 has a larger diameter than the first support 202 used for the pre-compression stage for placing on said upper surface 7 of the bowl hood 6.

Said screw 207 is with the threading 211 (see FIG. 3) on its second threaded end 209 fastened in the first interior threading 214 of the distributor 19. The nut 215 is turned in relation to said first threaded end 208 of said screw 207 rotating against the first end 203 of the support 202' thus lifting said distributor 19 to an upper position until said stack 13 of separating discs is making contact against said bowl hood 6 and said stack 13 of separating discs is fully compressed. A typical torque with which the compression is performed may be 50 Nm.

The lock ring 22 (FIG. 5) is then tightened into said second threading 21 of said distributor 19 to press against said bowl hood 6 or said neck ring 27. The compression tool 201 is then dismounted while the lock ring 22 prevents the distributor 19 to retain its original position.

In the above, the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A method for mounting a stack of separating discs in a centrifugal separator bowl comprising a bowl body and a bowl hood, the method comprising steps of:
   a) mounting said stack of separating discs on a distributor;
   b) placing and rotatably fixing said distributor in said bowl body;
   c) mounting said bowl hood on said bowl body;
   d) arranging a compression tool for compressing said stack of separating discs, said compression tool comprising a first support having a centre axis, a screw arranged coaxially with said centre axis in said first support, and a nut threaded onto a first threaded end of said screw and adapted to be resting against a first end of said first support, with a second end of said first support resting axially on said bowl hood or a neck ring attached to said bowl hood and said screw extending into a central through-hole in said bowl hood;
   e) fastening said screw with a second threaded end in a first threading of said distributor;
   f) tightening said nut, in relation to said first threaded end of said screw in such a manner that said distributor is lifted to an upper position;
   g) fixing said distributor in its upper position; and
   h) dismounting said compression tool.

2. The method according to claim 1, wherein step f) comprises a step of:
   i) tightening said nut until said stack of separating discs is making contact against said bowl hood.

3. The method according to claim 2, wherein step f) comprises a step of:
   j) tightening said nut until said stack of separating discs is compressed with a predetermined torque.

4. The method according to claim 3, wherein step a) comprises a step of:
   k) mounting the stack of separating discs pre-compressed on said distributor.

5. The method according to claim 3, wherein step c) comprises a step of:
   o) mounting a threaded lock ring around said screw, and wherein step g) comprises a step of:
   p) screwing the lock ring into a second threading of said distributor adapted to press against said bowl hood or said neck ring.

6. The method according to claim 3, wherein step c) comprises a step of:
   q) threading said bowl hood onto said bowl body by corresponding threadings.

7. The method according to claim 2, wherein step a) comprises a step of:
   k) mounting the stack of separating discs pre-compressed on said distributor.

8. The method according to claim 2, wherein step c) comprises a step of:
   o) mounting a threaded lock ring around said screw, and wherein step g) comprises a step of:
   p) screwing the lock ring into a second threading of said distributor adapted to press against said bowl hood or said neck ring.

9. The method according to claim 2, wherein step c) comprises a step of:
   q) threading said bowl hood onto said bowl body by corresponding threadings.

10. The method according to claim 1, wherein step a) comprises a step of:
    k) mounting the stack of separating discs pre-compressed on said distributor.

11. The method according to claim 10, wherein step k) comprises steps of:
    l) arranging the compression tool for pre-compressing said stack of separating discs, comprising a second support having a centre axis, the screw arranged coaxially with said centre axis in said second support, and a nut threaded onto a first threaded end of said screw and adapted to be resting against a first end of said second support, with a second end of said second support on the uppermost disc of said stack of separating discs;
    m) fastening said screw with its second threaded end in a first threading in said distributor; and
    n) turning said nut clock-wise in relation to said first threaded end of said screw in such a manner that said distributor is lifted in relation to said second support so that said stack of separating discs is pre-compressed with a predetermined torque.

12. The method according to claim 11, wherein step d) before compression is modified such that said compression tool or at least said nut and said second support is dismounted and when arranging the compression tool a first support is used.

13. The method according to claim 12, wherein step c) comprises a step of:
    o) mounting a threaded lock ring around said screw, and wherein step g) comprises a step of:
    p) screwing the lock ring into a second threading of said distributor adapted to press against said bowl hood or said neck ring.

14. The method according to claim 11, wherein step c) comprises a step of:
    o) mounting a threaded lock ring around said screw, and wherein step g) comprises a step of:
    p) screwing the lock ring into a second threading of said distributor adapted to press against said bowl hood or said neck ring.

15. The method according to claim 10, wherein step c) comprises a step of:
    o) mounting a threaded lock ring around said screw, and wherein step g) comprises a step of:
    p) screwing the lock ring into a second threading of said distributor adapted to press against said bowl hood or said neck ring.

16. The method according to claim 10, wherein step c) comprises a step of:
    q) threading said bowl hood onto said bowl body by corresponding threadings.

17. The method according to claim 1, wherein step c) comprises a step of:
    o) mounting a threaded lock ring around said screw, and wherein step g) comprises a step of:
    p) screwing the lock ring into a second threading of said distributor adapted to press against said bowl hood or said neck ring.

18. The method according to claim 1, wherein step c) comprises a step of:
    q) threading said bowl hood onto said bowl body by corresponding threadings.

* * * * *